(12) United States Patent
Henning

(10) Patent No.: US 7,133,455 B2
(45) Date of Patent: Nov. 7, 2006

(54) PROVIDING ERROR RESILIENCE AND CONCEALMENT FOR VIDEO DATA

(75) Inventor: Russell E. Henning, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 1019 days.

(21) Appl. No.: 09/751,129

(22) Filed: Dec. 29, 2000

(65) Prior Publication Data

US 2002/0085637 A1 Jul. 4, 2002

(51) Int. Cl.
 *H04N 7/12* (2006.01)

(52) U.S. Cl. .............................. 375/240.27; 375/240.15; 375/240.25

(58) Field of Classification Search .................. 375/240.01–240.29
See application file for complete search history.

(56) References Cited

U.S. PATENT DOCUMENTS

| | | | | | |
|---|---|---|---|---|---|
| 5,212,549 | A | * | 5/1993 | Ng et al. ................ | 375/240.15 |
| 5,455,629 | A | * | 10/1995 | Sun et al. ............... | 375/240.27 |
| 5,508,744 | A | * | 4/1996 | Savatier .................. | 375/240.16 |
| 5,550,847 | A | * | 8/1996 | Zhu ........................... | 714/748 |
| 5,568,200 | A | * | 10/1996 | Pearlstein et al. ...... | 375/240.27 |
| 5,621,467 | A | * | 4/1997 | Chien et al. ............ | 375/240.15 |
| 5,778,143 | A | * | 7/1998 | Boyce ........................ | 386/111 |
| 6,111,916 | A | | 8/2000 | Talluri et al. ........... | 375/240.23 |
| 6,137,915 | A | * | 10/2000 | Chai ............................ | 382/240 |
| 6,259,736 | B1 | * | 7/2001 | Chujoh et al. ......... | 375/240.13 |
| 6,289,485 | B1 | * | 9/2001 | Shiomoto .................... | 714/779 |
| 6,441,755 | B1 | * | 8/2002 | Dietz et al. .................. | 341/50 |
| 6,445,742 | B1 | * | 9/2002 | Yoo et al. .............. | 375/240.27 |
| 6,498,809 | B1 | | 12/2002 | Dean et al. ................. | 375/240 |
| 6,498,865 | B1 | | 12/2002 | Brailean et al. ........... | 382/239 |
| 6,552,673 | B1 | * | 4/2003 | Webb ........................... | 341/67 |
| 6,553,147 | B1 | * | 4/2003 | Chai et al. .................. | 382/240 |
| 6,611,561 | B1 | * | 8/2003 | Hannuksela et al. ... | 375/240.27 |
| 5,778,191 | A1 | * | 12/2003 | Levine et al. ................. | 79/247 |
| 6,662,329 | B1 | * | 12/2003 | Foster et al. ................ | 714/747 |
| 6,768,775 | B1 | | 7/2004 | Wen et al. ............. | 375/240.23 |
| 6,959,046 | B1 | | 10/2005 | Dufour et al. ......... | 375/240.28 |

OTHER PUBLICATIONS

M. Budagavi, W. R. Heinzelman, J. Webb, R. Talluri, "Wireless MPEG–4 Video Communication on DSP Chips," *IEEE Signal Processing Magazine*, vol. 17, No. 1, Jan. 2000, pp. 36–53.

P. Salama, N.B. Shroff, and E. J. Delp, "Error Concealment in MPEG Video Streams Over ATM Networks," *IEEE J–SAC*, vol. 18, No. 6, Jun. 2000, pp. 1129–1144.

R. Hennning and C. Chakrabarti, "A Quality/Energy Tradeoff Approach for IDCT Computation in MPEG–2 Video Decoding," in *Proceedings of SIPS*, Lafayette, LA, Oct. 2000, pp. 90–99.

P. Assuncao and M. Ghanbari, "A Frequency Domain Video Transcoder for Dynamic Bit Rate Reduction of MPEG–2 Bit Streams," *IEEE Transactions on Circuits and Systems for Video Technology*, vol. 8, Dec. 1998, pp. 953–967.

Y. Nakajima, H. Hori, and T. Kanoh, "Rate Conversion of MPEG Coded Video by Requantization Process," in *IEEE International Conference on Image Processing*, Washington, D.C., Oct. 1995, vol. 3, pp. 408–411.

* cited by examiner

*Primary Examiner*—Andy Rao
(74) *Attorney, Agent, or Firm*—Trop, Pruner & Hu, P.C.

(57) ABSTRACT

An apparatus for providing error concealment, error resilience, and/or error resilience modification. The apparatus includes a first block to process a P-type frame in a video bitstream using a first error resilience technique. The apparatus further includes a second block to process a B-type frame in the video bitstream using a second error resilience technique that is different from the first error resilience technique.

18 Claims, 7 Drawing Sheets

PROVIDING ERROR RESILIENCE AND CONCEALMENT FOR VIDEO DATA

BACKGROUND

This invention relates generally to providing error resilience and concealment for video data.

Video communication is becoming a popular form of communication over the Internet, wireless telephones, and other video telephones. The primary challenge for video communications is the enormous bandwidth required for transmitting video signals. As such, developers have turned to video compression and have proposed a variety of standards for compressing video signals before transmission. One such standard is the Moving Picture Experts Group (MPEG-2) standard, which is described in ISO/IEC 13818-1 (MPEG-2 Systems), ISO/IEC 13818-2 (MPEG-2 Video), dated in 1994 and provided by the International Organization For Standardization (ISO) and the International Electrotechnical Commission (IEC).

One inherent problem with video communications systems is that information may be altered or lost during transmission due to channel noise, for example. As such, error recovery methods are becoming increasingly popular because of the growing interest of transmitting video over unreliable channels, such as wireless networks and the Internet.

Currently, MPEG standards define three types of frames, namely intraframe (I-type) frames, which use no temporal prediction, interframe (P-type) frames, which are predictively encoded based on past I- or P-type frames, and bi-directionally predicted (B-type) frames, which are predictively encoded based on past or future I- or P-type frames. The error resilience and concealment techniques so far have focused primarily on P-type frames, because B-type frames are generally not used for low bitrate MPEG-4 and H.263 compression. Error resilience and concealment techniques, however, may sometimes be complex and computationally taxing. Complex error resilience techniques, for example, may require more bandwidth allocation for error resilience. Additionally, complex error resilience or concealment techniques may require high-speed, and oft expensive, hardware resources. As such, efficient methods of providing error resilience and error concealment that take advantage of cases where B-type frames are used in addition to P-type frames may be desirable.

Efficient techniques may also be desirable in modifying the error resilience of an encoded video bitstream. For example, a device receiving an encoded video bitstream may need to retransmit, or, alternatively, store the encoded video bitstream. In the process of storing or re-transmitting the encoded video bitstream, the device, such as a cell phone or a personal digital assistance (PDA), may perform undesirable complex computations, which may not only consume additional energy but may also be operationally inefficient.

Thus, there is a need to provide an efficient method of error resilience before transmission, retransmission, or storage, and an efficient method of error concealment while receiving an encoded video bitstream.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION

Figure 1:
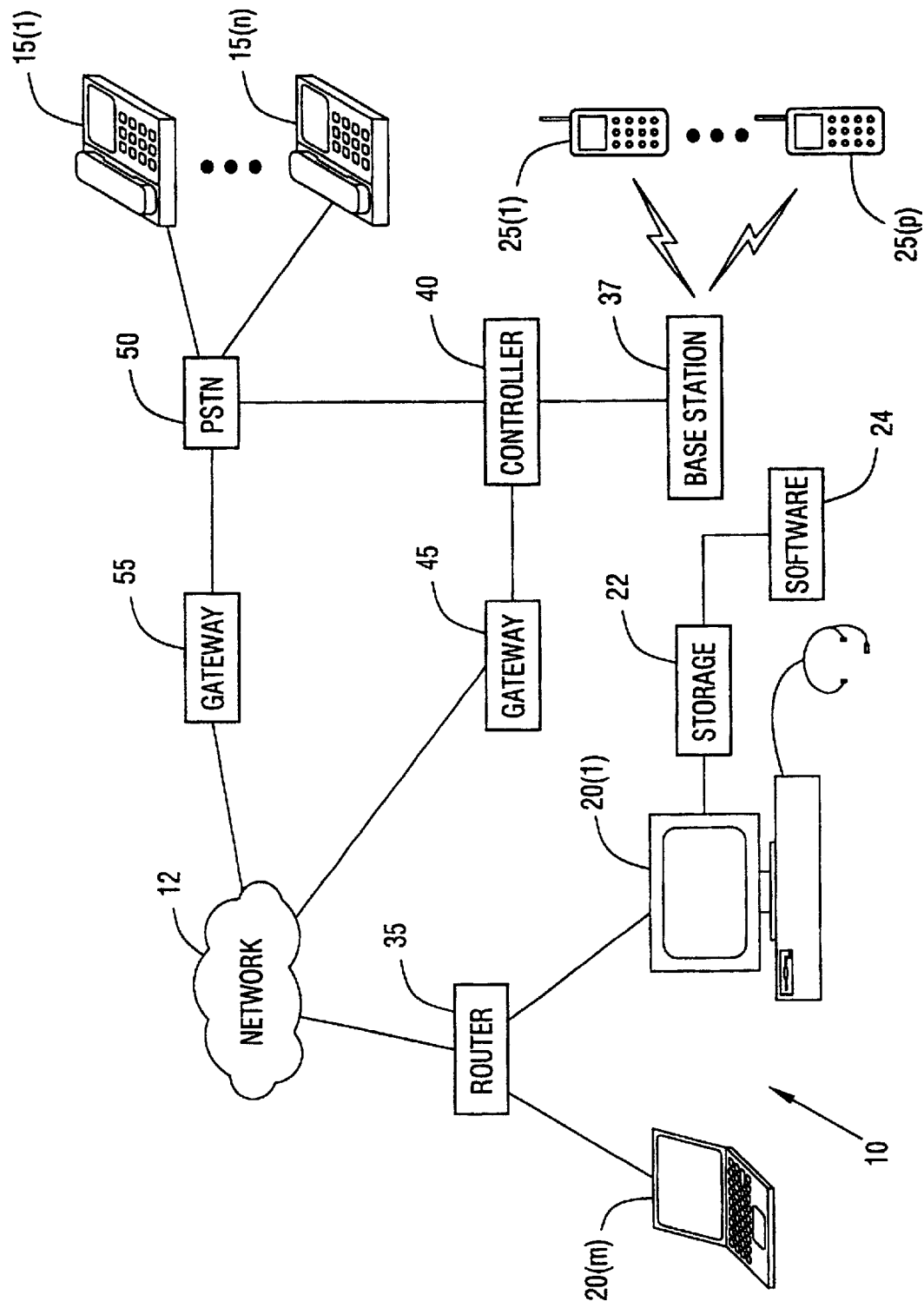
FIG. 1 is a block diagram of a communications system having one or more telecommunications devices in accordance with one embodiment of the present invention.

Referring to FIG. 1, communications system 10 includes a data network 12 and various telecommunications devices 15(1-*n*), 20(1-*m*), 25(1-*p*) in one embodiment. In one embodiment, the data network 12 is a packet-based data network, and may include a public network such as the Internet or private networks such as local area networks (LANs) or wide area networks (WANs). As used here a "data network" or "network" may refer to one or more communications networks, channels, links, or paths as well as systems or devices (such as routers or switches) used to route data over such networks, channels, links, or paths.

In the exemplary arrangement of FIG. 1, the various telecommunications devices may include one or more telephones 15(1-*n*), network telephones 20(1-*m*), and wireless phones 25(1-*p*). The telecommunications devices 15(1-*n*), 20(1-*m*), 25(1-*p*) in accordance with one embodiment of the present invention may be any device capable of receiving, storing, and/or transmitting video signals. In alternative embodiments, although not shown, the telecommunications devices may include personal digital assistants (PDA), television set top boxes, or other electronic devices capable of receiving, storing, or transmitting video signals. The network telephones 20(1-*m*), as well as other telecommunication devices, may include a storage unit 22 and software 24 stored therein, in one embodiment.

The communications system 10 may include a network router 35 through which one or more of the network telephones 20(1-*m*) may communicate with other telecommunications devices over the data network 12. The term "network telephones" may include any device, such as a computer or an Internet phone that is capable of communicating with another telecommunications device over the data network 12. In an alternative embodiment, it may be possible for one or more of the network telephones 20(1-*m*) to interface with the data network 12 without the network router 35.

One or more wireless phones 25 (1-*p*) may communicate with a base station 37, which may, in one embodiment, be coupled to the data network 12 through a controller 40 and a gateway 45. The controller 40 may also be coupled to a public switched telephone network (PSTN) 50 that supports the one or more telephones 15(1-$n$). The PSTN 50 may be coupled to the data network 12 through a gateway 55.

In one embodiment, any one of the telecommunications devices may be able of to communicate with any of the other telecommunications devices of FIG. 1. Thus, for example, the wireless telephone 25(1) may be capable of communicating with another wireless telephone 25(2-$p$) or, alternatively, may be capable of communicating with one of the network telephones 20(1-$m$) or the telephones 15(1-$n$), and vice versa.

Figure 2:
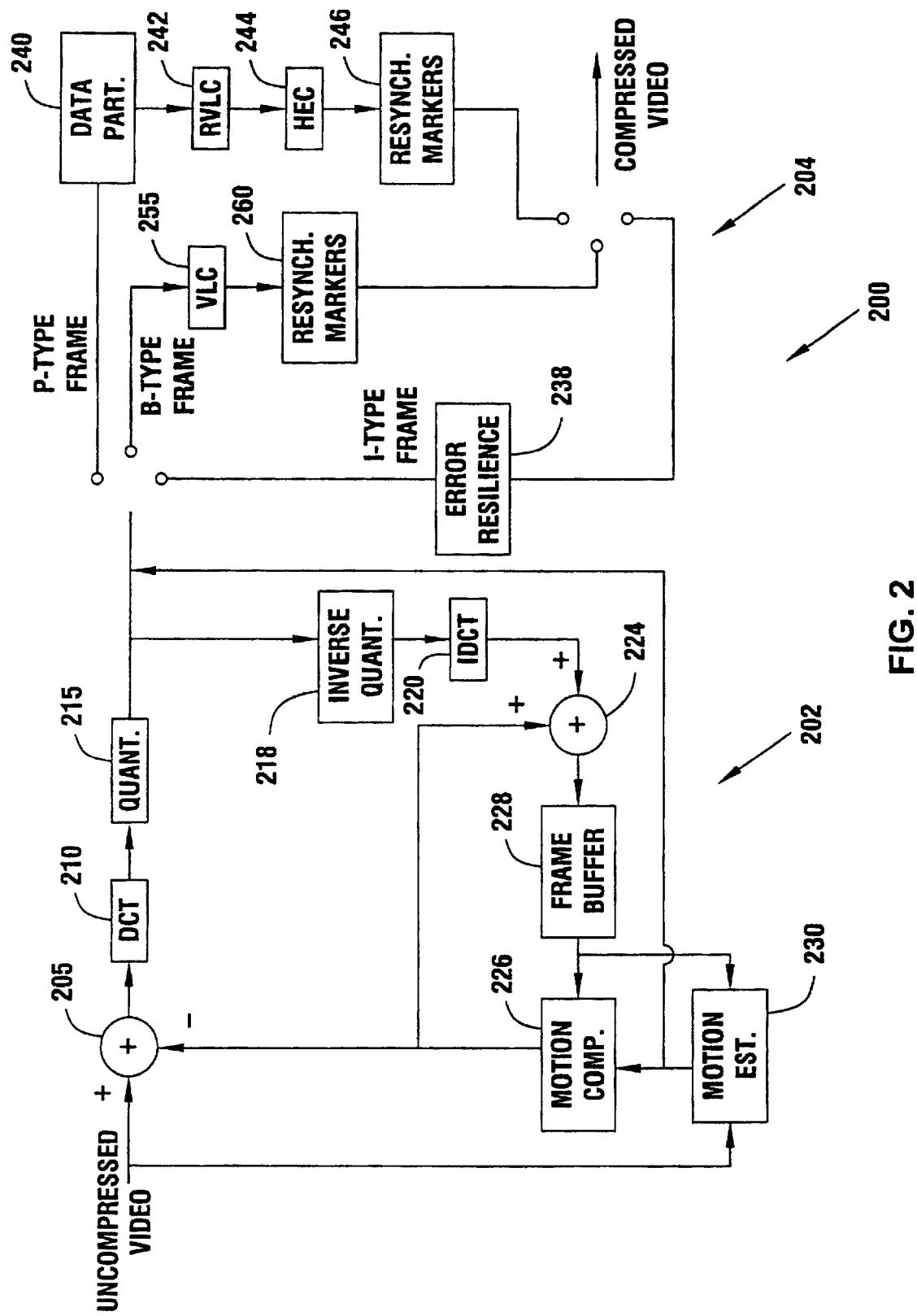
FIG. 2 is a block diagram of an encoder that may be employed in the one or more telecommunications devices of the communications system of FIG. 1, in accordance with one embodiment of the present invention.

Referring now to FIG. 2, a block diagram of one embodiment of an encoder 200 that may be employed in the telecommunications devices of the communications system 10 of FIG. 1 is illustrated. The encoder 200, in alternative embodiments, may also be implemented in other elements of the communications system of FIG. 1, such as the controller 40, router 35, base station 37, and the like. Although not so limited, in the illustrated embodiment, the encoder is an MPEG video encoder.

The Moving Pictures Experts Group, known as MPEG, was established in 1988 to develop a standard for the compression of both video and audio data streams. The MPEG-2 standard, for example, was defined in 1990 to support television applications including broadcast transmissions. MPEG-2 refers to International Organization for Standardization (ISO) and International Electrotechnical Commission (IEC) Standard 13818-1 (systems), 13818–2 (video), 13818–3 (audio) and 13818-4 (compliance) (1994).

Under the guidance of the MPEG-2 standard, several techniques for performing video compression are now widely employed. For each technique used during the encoding process, a corresponding inverse technique may be used during decoding of the video.

Referring again to FIG. 2, the encoder 200 in the illustrated embodiment includes an encoding portion 202 and error resilience (ER) portion 204. The encoder 200 is described in separate portions 202, 204 for illustrative purposes only, as in alternative embodiments one or more elements of the two portions 202, 204 may overlap.

The encoder 200 receives, in one embodiment, an input video stream that passes through a subtractor 205 to a discrete cosine transform (DCT) block 210. In accordance with one or more embodiments of the present invention, pictures are coded (or encoded) by the encoder 200 in at least one of three modes: I-type frame (sometimes also referred to as "intra-code pictures"), P-type frame (sometimes also referred to as "predictive coded pictures"), and B-type frame (sometimes also referred to as "bi-directionally predictive coded pictures). I-type frames are typically encoded without any relation to the previous image, which means that such frames may be decoded without knowledge of other frames. For P-type frames, the current image is predicted from a previously reconstructed image, and the difference between the current image and the predicted image (sometimes referred to as the residual image) is encoded. The B-type frames are predictively encoded based on past or future images. Typically, the basic unit of information that is operated upon is called a macroblock.

The DCT block 210 process portions, called blocks, of a macroblock. Using a DCT, a set of frequency coefficients that can typically be encoded with fewer bits than the pixel-domain description of each block are found. The output signal of the DCT block 210 is provided to an input terminal of a quantizer block 215.

The quantizer block 215 quantizes the coefficients created during the DCT operation such that, in one embodiment, the coefficients may be represented using fewer bits. Some loss of information usually occurs during this process, which is why MPEG-2 is known as a "lossy" compression technique. The quantization method may be adjusted, depending on the image, to minimize the amount of information lost during quantization.

An output signal from the quantizer block 215 is provided to an inverse quantizer block 218, the output signal of which is provided to an inverse discrete cosine transform (IDCT) block 220. An adder 224 receives an output signal from the IDCT block 220 and from a motion compensation block 226, sums the two signals, and provides an output signal to a frame buffer 228. In one embodiment, the frame buffer 228 stores one or more previously transmitted video frames. An output signal from the frame buffer 228 is provided to the motion compensation block 226, as well as to the motion estimator block 230.

The motion estimator block 230 receives the output signal from the frame buffer 228 and the incoming video stream and provides an output signal to the motion compensation block 226. In one embodiment, the motion estimation block 230 compares previously transmitted pictures to the present picture data in order to generate motion vectors for temporal compression of the picture data in the video bitstream. The motion compensation block 226, in one embodiment, generates a predicted picture signal that is provided to the subtractor 205.

The output from the quantizer block 215 is provided to an error resilience (ER) portion 204. In accordance with one embodiment of the present invention, the ER portion 204 provides a different error resilience technique for I-type, P-type, and B-type frames. Error resilience techniques typically limit the scope of degradations that errors in the compressed video cause in the decoded video bitstream. In an alternative embodiment, a common error resilience technique may be employed for I-type and P-type frames. For the I-type frames, in one embodiment, an error resilience block 238 may perform the desired error resilience. The particular technique applied by the error resilience block 238 may be implementation specific, depending on the desired goals.

For the P-type frames, in one embodiment, the error resilience technique includes data partitioning by a data partitioning block 240, reversible variable length coding by a reversible length code (RVLC) block 242, header extension coding by a header extension code (HEC) block 244, and resynchronization marking by a resynchronization marker (RM) block 246.

The RM block 246, in one embodiment, places markers (e.g., a unique code) every selected number of bits apart so that the receiving device can resynchronize with the transmitting device whenever an error is detected. Resynchronization markers signal the beginning of what is known as a video packet. A video packet begins with a new macroblock and each packet is typically independent of other packets (i.e., a video packet can be decoded regardless of any other packets being lost). Thus, resynchronization markers allow the decoder to find a place in the bitstream where the decoder can begin correctly parsing data after an error is detected. For P-type frames, in one embodiment, the RM block 246 uses resynchronization markers approximately every 750 bits, although, in other embodiments, a different interval may be used.

The data-partitioning block 240, in one embodiment, partitions the macroblock data within a video packet in a manner that allows a receiving telecommunications device to recover more data from a corrupted video packet. As an example, for P-type frames, the macroblock data may be partitioned into a motion part and a texture part (e.g., DCT coefficients) separated by a unique motion marker (MM), where the MM indicates to the receiving device the end of the motion information and the beginning of texture portion. Thus, if only the texture information is lost, data partitioning allows the use of motion information to conceal errors in a more effective manner. In other embodiments, other data partitioning techniques may be employed.

The RVLC block 242, in one embodiment, allows the receiving telecommunications device to recover more DCT coefficient data from a corrupted texture partition. Typically, RVLCs are designed such that they can be decoded both in the forward and backward direction. That is, while decoding the video bitstream in the forward direction, if the receiving telecommunications device detects an error it can jump to the next resynchronization marker and start decoding the bitstream in the backward direction until it encounters an error. Based on the two error locations, the receiving telecommunications device can recover some of the data that would have otherwise been discarded. Because the error may not be detected as soon as it occurs, the receiving telecommunications device may conservatively discard additional bits around the corrupted region. Thus, without RVLCs, more data in the texture partition of the video packet may have to be discarded.

The HEC block 244, in one embodiment, duplicates at least a portion of the header information in the video frame to reduce the number of discarded video frames. Typically, the header of each video frame contains useful information, such as the spatial dimensions of the video data, the time stamps associated with the decoding and the presentation of this video data, and the type of current frame (e.g., I-type, P-type, B-type). If some of this information becomes corrupted due to channel errors, the receiving telecommunications device typically has to discard all of the information belonging to the current video frame. In one embodiment, as mentioned above, the HEC block 244 duplicates at least a portion of the header information so that, in case of a corruption in the header information, the duplicate information may be used to verify and correct the header information of the video frame.

In accordance with one embodiment of the present invention, a different error resilience technique is utilized for B-type frames. In some embodiments, a simpler (e.g., computationally less complex) error resilience technique may be employed. Although not so limited, in the illustrated embodiment the B-type frames are processed by a variable length coder (VLC) block 255 and a resynchronization marker block (RM) 260. The VLC block 255, in one embodiment, replaces frequently occurring bit patterns with codes of shorter length, thereby reducing the total number of bits to be transmitted. In one embodiment, the RM block 260 applies resynchronization markers at a longer interval than that used for P-type frames (e.g., every 2000 bits for B-type frames versus every 750 bits for P-type frames). In alternate embodiments, the same or longer interval than that applied for P-type frames may be employed for B-type frames. Typically, the longer the interval, the less bandwidth that is required for error resilience since not as many resynchronization markers and bits are inserted in the video bitstream to align video packets with macroblock borders and achieve constant bit length intervals between markers.

The error resilience techniques shown in FIG. 2 are examples only, and it should be noted that a variety of other techniques may be employed. For example, for P-type frames, additional error resilience blocks may be added for a more robust error resilience technique or removed (e.g., the data partitioning block 240 or HEC block 244 may be removed) for a less robust error resilience technique. Likewise, the error resilience techniques for B-type frames may be further simplified, altered, or enhanced, depending on the implementation goals.

Figure 3:
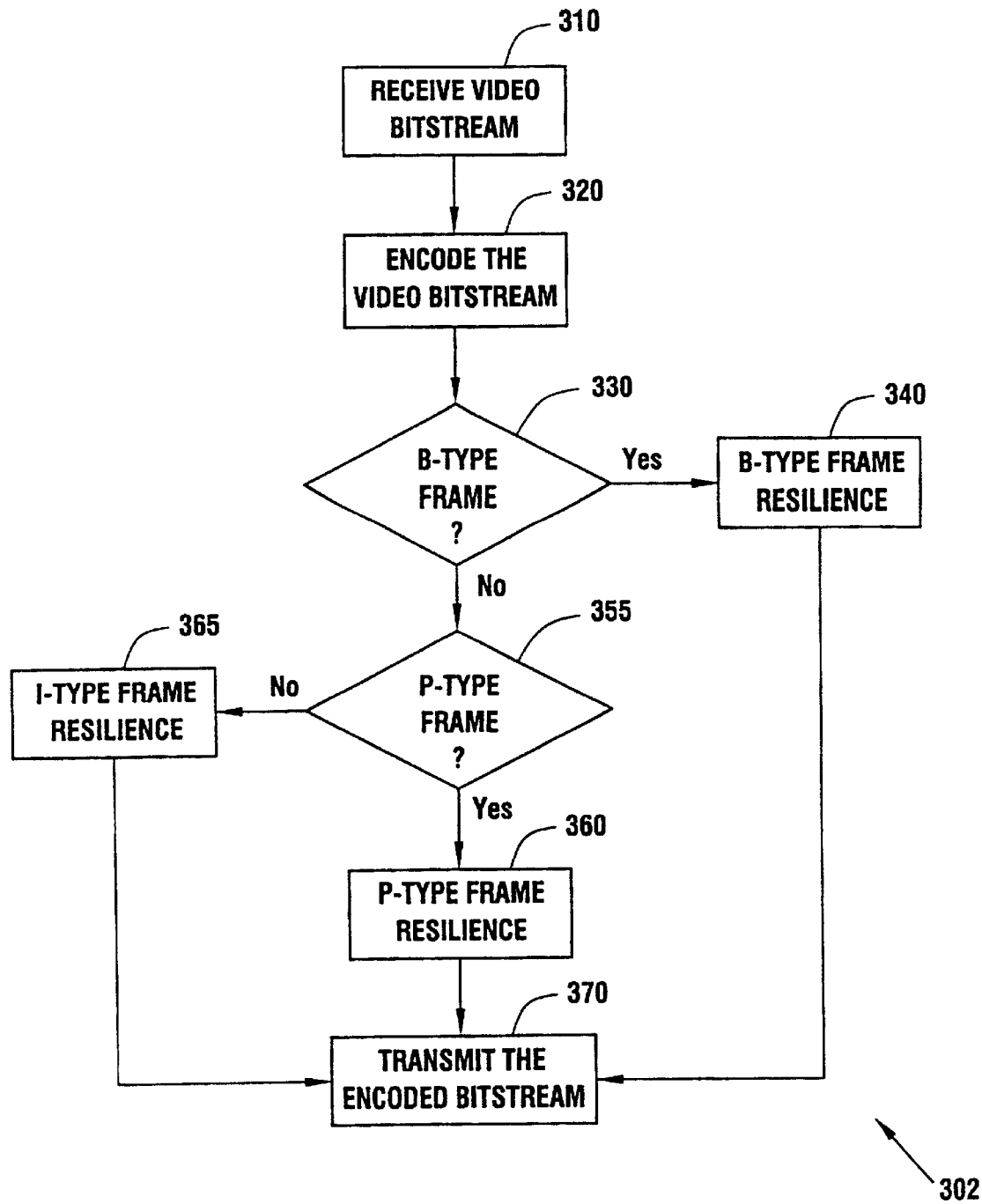
FIG. 3 is a flow diagram of a method that may be employed by the encoder of FIG. 2 in accordance with one embodiment of the present invention.

Referring now to FIG. 3, a method 302 in accordance with one embodiment of the present invention for encoding video data using the encoder 200 of FIG. 2 is illustrated. In one embodiment, the method 302 may be implemented in software that is resident in a telecommunications device. The encoder 200 receives (at 310) a video bitstream. The encoder 200 encodes (at 320) the video bitstream. The encoder 200 determines if (at 330) the encoded macroblock is a B-type frame. If the encoded macroblock is a B-type frame, then error resilience is performed (at 340) by the VLC block 255 and the RM block 260, in one embodiment. Although the VLC block 255 in the illustrated embodiment is described as part of the error resilience process, in an alternative embodiment, it may be part of the encoding process. The error resilience technique and/or configuration employed for B-type frames may, in one embodiment, be different from those used for the P-type frames. In one embodiment, the error resilience technique and/or configuration used for B-type frames may be simpler, and thus may require less bandwidth and computational complexity for error resilience, than those used for the P-type frames.

If (at 330) the encoded macroblock is not a B-type frame, then the encoder 200 determines if (at 355) the encoded macroblock is a P-type frame. If the encoded macroblock is a P-type frame, then, in one embodiment, the error resilience is provided (at 360) by the data partitioning block 240, the RVLC block 242, the HEC block 244, and the RM block 246 of FIG. 2.

If (at 355) the encoded macroblock is not a P-type frame, then the error resilience is provided (at block 365) for I-type frames by the error resilience block 238 of the encoder 200.

The video bitstream may be, in one embodiment, transmitted (at 370) after the error resilience is complete. The transmitted encoded video bitstream may be received, in one embodiment, by a receiving telecommunications device, as described more fully below.

Figure 4:
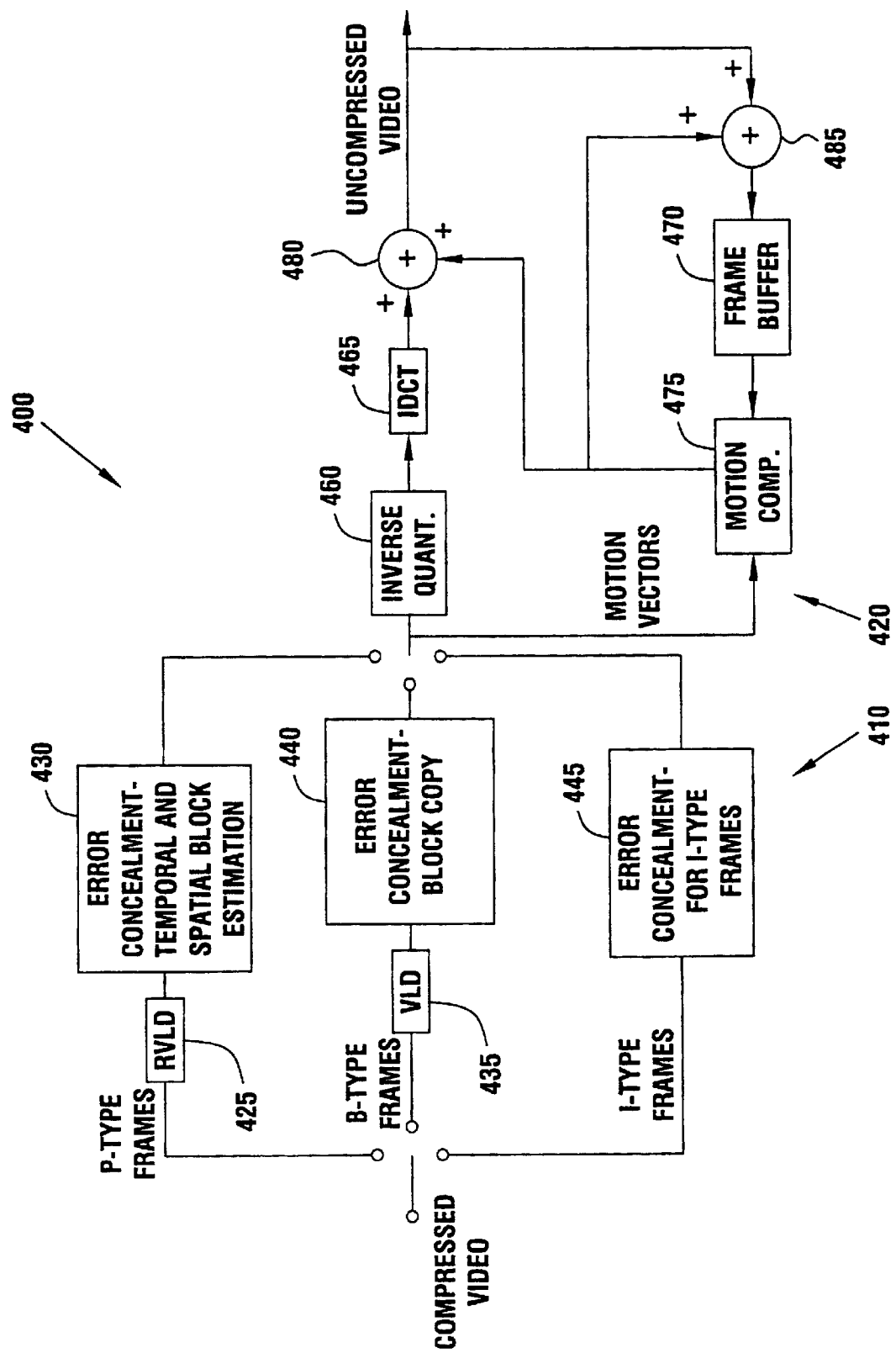
FIG. 4 is a block diagram of a decoder that may be employed in the one or more telecommunications devices of the communications system of FIG. 1, in accordance with one embodiment of the present invention.

Referring now to FIG. 4, a block diagram of an embodiment of a decoder 400 that may be employed in the telecommunications devices of the communications system 10 of FIG. 1 is illustrated. The decoder 400, in alternative embodiments, may also be implemented in other elements of the communications system of FIG. 1, such as the controller 40, router 35, base station 37, and the like. Although not so limited, in the illustrated embodiment, the decoder is an MPEG video decoder.

The decoder 400 in the illustrated embodiment includes an error concealment portion 410 and a decoding portion 420. The decoder 400 is described in separate portions 410, 420 for illustrative purposes only, as in alternative embodiments some elements of the two portions 410, 420 may overlap.

The error concealment portion 410 of the decoder 400 receives, in one embodiment, the transmitted video bitstream that was encoded by the encoder of FIG. 2. In one embodiment, the error concealment portion 410 of the decoder 400 includes three error concealment paths, one for each of the three different types (e.g., I, P, B) of frames. In an alternative embodiment, the I-type and P-type frames may share a common error concealment path. In accordance with one embodiment of the present invention, the decoder 400 employs a different error concealment technique for B-type frames than for P-type frames. In one embodiment, the error concealment technique may be simpler, and thereby require less processing than the error concealment technique for P-type frames.

For the P-type frames, error concealment may be performed by a reversible variable-length decoding (RVLD) block 425 and an error concealment (EC) block 430. The RVLD block 425, in one embodiment, decodes the coding performed by the RVLC block 242 of the encoder 200 (see FIG. 2). The EC block 430, in one embodiment, may perform error concealment based on temporal, spatial, or frequency-domain prediction of the lost data. One form of temporal error concealment may be to copy the lost data from a previous frame. Sometimes the missing motion vector may be predicted from neighboring macroblocks, or the motion vector may not have been lost if data-partitioning tools are used. Temporal concealment generally may not be used for the first frame. Concealment in the spatial domain, in one embodiment, may involve more computation for interpolation. In some instances, frequency-domain interpolation may be more convenient, by estimating the DC value and possibly some low-order DCT coefficients.

For the I-type frames, error concealment may be performed by an error concealment (EC) block 445, in one embodiment. The particular technique employed for the EC block 445 may generally be implementation specific.

For the B-type frames, error concealment may be performed by a variable-length decoding (VLD) block 435 and an error concealment block 440. In one embodiment, the VLD block 435 decodes the information encoded in the received compressed video stream, such as DCT coefficients, motion vectors, and mode information. Although not so limited, in the illustrated embodiment, the EC block 440 performs a relatively simple form of error concealment by copying the lost data from the same location in a previous frame. For example, if the first macroblock of a current frame is lost or otherwise corrupted, the EC block 440 may retrieve the first block from a previously received frame and uses it in place of the lost block in the current frame.

In an alternative embodiment, the EC block 440 may perform an error concealment technique involving motion compensated block copy, which, in one embodiment, entails using motion vectors to recover the lost block. That is, the EC block 440 may use recovered motion vectors to determine which block(s) of the previous frame better correspond to the missing block(s) lost in the current frame, and then use those block(s) to replace the lost block. As an example, assuming that a first block of the frame is corrupted or lost, the EC block 440 may determine that it is in fact the second block in the previous frame that is closest in appearance to the first (i.e., lost) block in the current frame based on the recovered motion vectors. As such, the EC block 440, in one embodiment, may use the second block in the previous frame for error concealment instead of the first block of the previous frame. Thus, if header and motion information from a macroblock is available, it may be possible to effectively conceal the corrupted texture data.

The decoding portion 420 of the decoder 400, in one embodiment, comprises an inverse quantizer (IQ) block 460, an inverse discrete cosine transform (IDCT) block 465, a frame buffer 470, and a motion compensation (MC) block 475 in one embodiment. The IQ block 460 receives an output signal from the error concealment portion 410 of the decoder 400. The IQ block 460 processes the output signal from the error concealment portion 410 and provides an output signal to the IDCT 465. A signal adder 480 adds an output signal from the IDCT block 465 to an output signal from the MC block 475 and provides an uncompressed video signal that may be displayed on a display device (not shown) of a telecommunications device, for example.

In one embodiment, the uncompressed signal may also provide a second signal adder 485, which provides an output signal that is the sum of the uncompressed signal and the output signal from the motion compensation block 475 to the frame buffer 470. In one embodiment, the frame buffer 470 stores one or more of the previously received frames. The frame buffer 470 provides its output signal to the motion compensation block 475, which, in one embodiment, also receives the motion vectors associated with the incoming video bitstream.

In accordance with one or more embodiments of the present invention, using different, and in some instances simpler, error resilience techniques, error concealment techniques, and configurations for B-type frames may reduce computational complexity and the bandwidth consumed by error resilience. As a result, reduction in computational complexity for B-type frame processing can result in energy consumption reduction, as well as a reduction in processing speed requirements. It may be possible to simplify error resilience and concealment techniques for B-type frames because the errors in such frames do not generally affect other frames in the video sequence like the errors can in P-type or I-type frames. Thus, even with a greater error occurrence in B-type frames, (because of simpler error resilience and/or concealment techniques) the overall impact may be relatively benign, in some cases, as the errors in B-type frames may not typically propagate temporally.

In alternative embodiments, a variety of techniques and/or configurations (e.g., resynchronization markers at every pre-selected intervals) may be employed for error resilience and/or error concealment. Furthermore, one or more embodiments of the present invention may be extended to other video compression methods.

Figure 5:
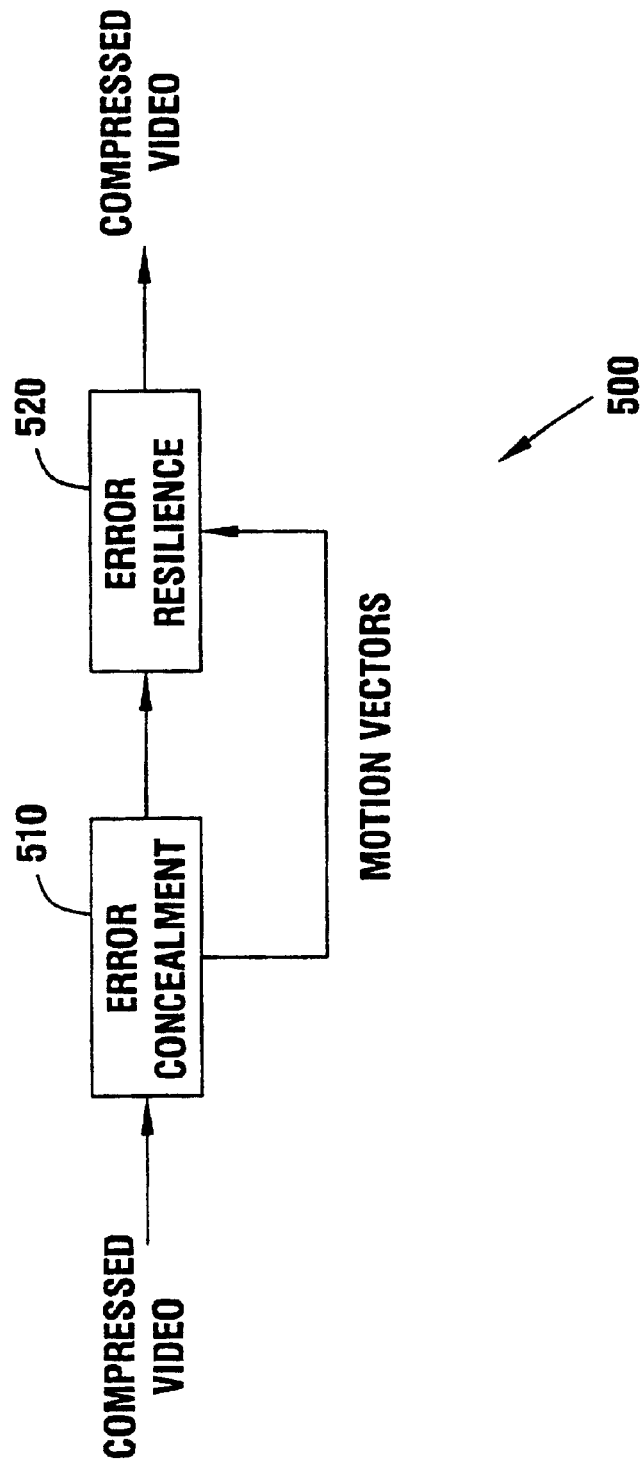
FIG. 5 is a block diagram of an error resilience modifier that may be employed in the one or more telecommunications devices of the communications system of FIG. 1, in accordance with one embodiment of the present invention.

Referring now to FIG. 5, a block diagram of one embodiment of a error-resilience modifier 500 that may be employed in one or more of the telecommunications devices of the communications system 10 of FIG. 1 is illustrated. The error-resilience modifier 500, in alternative embodiments, may also be implemented in other elements of the communications systems of FIG. 1, such as the controller 40, router 35, base station 37, and the like. In one embodiment, the error-resilience modifier 500 receives an encoded bitstream and modifies the error resilience of the encoded bitstream before it is re-transmitted or stored in a storage unit.

The error-resilience modifier 500, in one embodiment, includes an error concealment (EC) block 510 and an error resilience (ER) block 520. In one embodiment, the EC block 510 forwards the motion vectors it recovers to the ER block 520. A telecommunications device having the error-resilience modifier 500 may, in one embodiment, receive an encoded video bitstream, perform error concealment and error resilience on the encoded video bitstream using the EC block 510 and ER block 520, respectively, and then retransmit or store (depending on the implementation) the modified video bitstream.

In accordance with one embodiment of the present invention, the error-resilience modifier 500 is able to perform error concealment and error resilience on the received encoded video bitstream without employing one or more of the computationally complex blocks in the encoding portion 202 (see FIG. 2) and decoding portion 420 (see FIG. 4) of the encoder 200 and decoder 400, respectively. This may be possible, for example, because the blocks in the encoding portion 202 and decoding portion 420 of the encoder 200 and decoder 400, respectively, essentially cancel each other when placed in series.

In one embodiment, the error-resilience modifier 500 is able to modify the error resilience bits of the incoming encoded video signal to better match the channel used for retransmission or storage, which may result in improved video quality or coding efficiency. For example, the error-resilience modifier 500 may enhance the error resilience technique for retransmission over more noisy channels, which may improve video quality. Alternatively, the error-resilience modifier 500 may employ a less robust error resilience technique (or none at all in an alternative embodiment) when transmitting to a less noisy device, such as a storage unit, which may improve coding efficiency since fewer bits may be used for error resilience.

Figure 6:
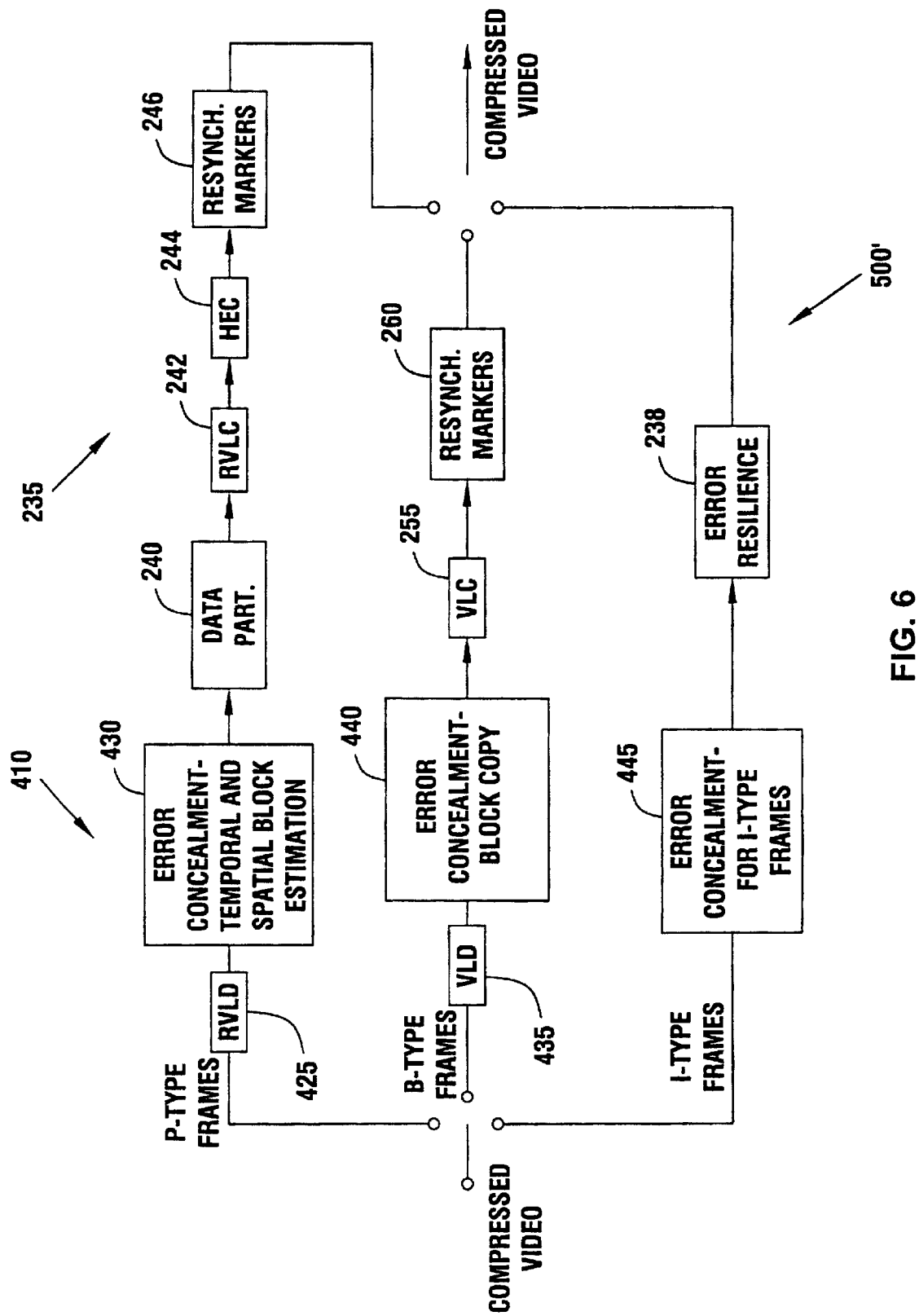
FIG. 6 is a block diagram of an alternative embodiment of the error-resilience modifier of FIG. 5.

Referring now to FIG. 6, a block diagram of an alternative embodiment of the error-resilience modifier 500 of FIG. 5 is illustrated. FIG. 6 illustrates an error-resilience modifier 500', which, in the illustrated embodiment, comprises an error concealment portion 410 of the decoder 400 from FIG. 4 and an error resilience portion 204 of the encoder 200 from Figure 200. The error-resilience modifier 500' is described in more detail with reference to FIG. 7 below.

Figure 7:
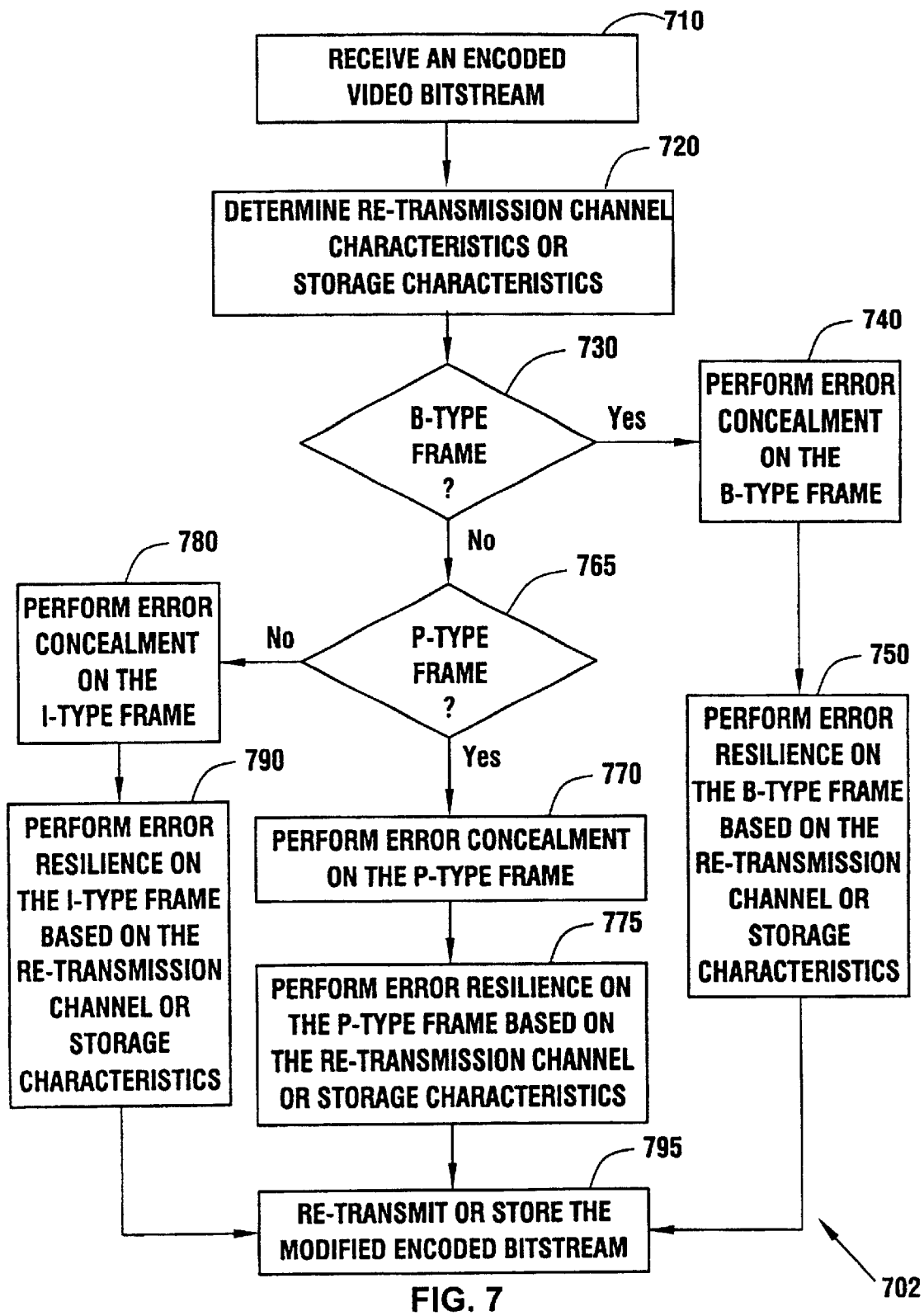
FIG. 7 is a flow diagram of a method that may be employed by the error-resilience modifier of FIG. 5, in accordance with one embodiment of the present invention.

Although not so limited, for illustrative purposes and ease of illustration, a method 702 of FIG. 7 is described in the context of the error-resilience modifier 500' receiving (at 710) the video bitstream encoded by the encoder 200 of FIG. 2. In one embodiment, the method 702 may be implemented in software that may be resident in a telecommunications device. The received encoded video bitstream may either be stored or re-transmitted to another location or device, depending on the implementation. If the received video bitstream is to be re-transmitted over a channel, for example, then one or more transmission characteristics of the channel over which it will be transmitted is determined (at 720), in one embodiment. For example, a signal-to-noise ratio of the one or more channels may be measured. If the received video bitstream is stored in a storage unit, then, in one embodiment, the noise-level (i.e., reliability) of the storage unit may be measured.

The error-resilience modifier 500' determines (at 730) if the current frame of the encoded bitstream is a B-type frame, and, if so, then the EC portion 410 performs (at 740) error concealment on the B-type frame using the VLD and EC blocks 435, 440. The ER portion 204 of the error-resilience modifier 500' performs (at 750) error resilience on the B-type frame based on the re-transmission channel characteristics using, in one embodiment, the VLC block 255 and RM block 260. That is, the complexity (i.e., robustness) of the error resilience technique may depend on the signal-to-noise ratio of the communication channel, for example. That is, a noisier channel may call for a more robust error resilience technique, while a relatively noiseless channel may not require much error resilience, if at all. For modifying error resilience of B-type frames, in one embodiment, computationally less complex error concealment and resilient techniques (as compared to the techniques used for P-type frames) may be used.

The error-resilience modifier 500' determines (at 765) if the current frame of the encoded bitstream is a P-type frame, and, if so, then the EC portion 410 performs (at 770) error concealment on the P-type frame using the RVLD and EC blocks 425, 430. The ER portion 204 of the error-resilience modifier 500' performs (at 775) error resilience on the P-type frame based on the re-transmission channel characteristics using, in one embodiment, the data partitioning block 240, RVLC block 242, HEC block 244, and RM block 246. Thus, for example, if the retransmission channel is particularly noisy, then a more robust error resilience technique may be employed.

If the error-resilience modifier 500' determines (at 765) that the current frame is not a P-type, then the EC portion 410 performs (at 780) error concealment on the I-type frame using the EC blocks 445. The ER portion 204 of the error-resilience modifier 500' performs (at 790) error resilience on the I-type frame based on the re-transmission channel characteristics using, in one embodiment, the ER block 238.

After the error concealment and error resilience techniques are performed, the modified video bitstream may then be re-transmitted and/or stored (at 795), depending on the particular implementation. The modified video bitstream may be re-transmitted, in one embodiment, to another telecommunications device.

In one embodiment, the re-transmission channel characteristics or storage characteristics may be determined before each transmission, and the error resilience techniques may be dynamically adjusted based on such transmission characteristics. Alternatively, the ER portion 204 may be pre-configured to take into account the re-transmission channel or storage characteristics.

Referring again to FIG. 5, some embodiments of the error-resilience modifier 500 may share one or more of the following advantages. The error-resilience modifier 500 may be advantageous in concealing errors that occur during the original transmission before (as opposed to after) the received encoded bitstream is retransmitted or stored. For example, a motion vector may be lost during the original transmission that may be almost estimated exactly by the error-resilience modifier 500 from the adjacent motion vectors. The lost motion vector may not be recoverable by a receiving device, however, if, for example, even the adjacent motion vectors are lost during a retransmission. In one embodiment, the video quality may be improved because the motion vectors and texture data are not based on the lossy video from decoding but rather on the original motion vectors and texture data. In one embodiment, the error-resilience modifier 500 may be compatible with requantization-based methods typically used in video retransmission. As such, the error-resilience modifier 500, in one embodiment, may be used in addition to requantization to accomplish further compression and/or error resilience, as needed. For example, if a particular bitrate is desired for the retransmitted or stored signal, appropriate tradeoffs may be made between bits resulting from resilience techniques and quantization accuracy.

The encoder 200 (FIG. 2), decoder 400 (see FIG. 4), and/or error-resilience modifier 500 (see FIG. 5) may be implemented in hardware, software, or a combination thereof. In one embodiment, one or more of the telecommunications devices may include one or more controllers, which may be processors, microprocessors, and the like. The instructions associated with the software implementation of such devices, for example, may be stored in storage units (22 see FIG. 1) within the telecommunication devices of FIG. 1, in one embodiment. In one embodiment, the instructions stored in the storage units may be executable on the one or more controllers. The storage units may include different forms of memory including semiconductor memory devices such as dynamic or static random access memories (DRAMs or SPAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. An article comprising one or more machine-readable storage media containing instructions that when executed enables a processor to:

receive a video stream having at least a first type of frame and a second type of frame; and process the first type of frame using a first error resilience technique and the second type of frame using a second error resilience technique, wherein the first error resilience technique comprises applying resynchronization markers to the video stream at a selected interval and the second error resilience technique comprises applying resynchronization markers at an interval different from the selected interval such that the second error resilience technique replaces a bit pattern for the second type of frame with a bit pattern of shorter length.

2. The article of claim 1, wherein the instructions when executed enable the processor to process a P-type frame using the first error resilience technique.

3. The article of claim 2, wherein the instructions when executed enable the processor to process a B-type frame using the second error resilience technique.

4. The article of claim 3, wherein the instructions when executed enable the processor to process the B-type frame using a simpler error resilience technique than the P-type frame.

5. The article of claim 4, wherein the instructions when executed enable the processor to insert resynchronization markers in the video stream at a first pre-selected interval for the B-type frame and at a second pre-selected interval for the P-type frame, wherein the first pre-selected interval is longer than the second pre-selected interval.

6. The article of claim 1, wherein the instructions when executed enable the processor to process the first type of frame using a first error concealment technique and the second type of frame using a second error concealment technique, wherein the first error concealment technique is different from the second error concealment technique.

7. The article of claim 1, wherein the instructions when executed enable the processor to insert fewer error resilience bits into the video stream for the B-type frame than for the P-type frame.

8. The article of claim 1, wherein the instructions when executed enable the processor to perform variable length coding on the B-type frame.

9. The article of claim 1, wherein the instructions when executed enable the processor to apply resynchronization markers to the video for the B-type frame.

10. A method comprising:

receiving a video stream having a first type of frame and a second type of frame; and processing the first type of frame using a first error resilience technique and a second type of frame using a second error resilience technique, wherein the first error resilience technique comprises applying resynchronization markers to the video stream at a selected interval and the second error resilience technique comprises applying resynchronization markers at an interval different from the selected interval such that the second error resilience technique replaces a bit pattern for the second type of frame with a bit pattern of shorter length.

11. The method of claim 10 including processing a p-type frame using the first error resilience technique.

12. The method of claim 11 including processing a b-type frame using the second error resilience technique.

13. The method of claim 12 including processing the b-type frame using a simpler error resilience technique than the p-type frame.

14. The method of claim 13 including inserting resynchronization markers in the video stream at a first pre-selected interval for the b-type frame and at a second pre-selected interval for the p-type frame, wherein the first selected pre-selected interval is longer than the second pre-selected interval.

15. The method of claim 10 including processing the first type of frame using a first error concealment technique and the second type of frame using a second error concealment technique, wherein the first error concealment technique is different from the second error concealment technique.

16. The method of claim 10 including inserting fewer error resilience bits into the video stream for the b-type frame then from the p-type frame.

17. The method of claim 10 including performing variable encoding on the b-type frame.

18. The method of claim 10 including applying resynchronization markers to the video for the b-type frame.

* * * * *

UNITED STATES PATENT AND TRADEMARK OFFICE
CERTIFICATE OF CORRECTION

| | | |
|---|---|---|
| PATENT NO. | : 7,133,455 B2 | Page 1 of 1 |
| APPLICATION NO. | : 09/751129 | |
| DATED | : November 7, 2006 | |
| INVENTOR(S) | : Russell E. Henning | |

It is certified that error appears in the above-identified patent and that said Letters Patent is hereby corrected as shown below:

Column 12:
Line 49, "then" should be --than--.

Signed and Sealed this

Second Day of January, 2007

JON W. DUDAS
*Director of the United States Patent and Trademark Office*